United States Patent [19]
Palathingal

[11] Patent Number: 6,097,740
[45] Date of Patent: Aug. 1, 2000

[54] METHOD AND APPARATUS OF PRODUCING COHERENT HIGH-FREQUENCY ELECTROMAGNETIC RADIATION BY INTERACTING BEAMS OF IONS AND ELECTRONS

[76] Inventor: Jose Chakkoru Palathingal, 424 Guadarrama La., Miradero Hills, Puerto Rico 00680

[21] Appl. No.: 09/162,804

[22] Filed: Sep. 29, 1998

[51] Int. Cl.$^7$ .................................................. H01S 3/0955
[52] U.S. Cl. .................................. 372/5; 372/73; 372/74
[58] Field of Search .............................. 372/1, 2, 5, 69, 372/73, 74, 76, 80

[56] References Cited

U.S. PATENT DOCUMENTS

| | | | |
|---|---|---|---|
| 3,826,996 | 7/1974 | Jaegle et al. | 372/5 |
| 3,955,153 | 5/1976 | Marié | 372/5 X |
| 4,053,783 | 10/1977 | Scully | 372/5 |
| 4,201,955 | 5/1980 | Elton et al. | 372/69 |
| 4,817,124 | 3/1989 | Ketterson et al. | 372/5 X |
| 4,933,950 | 6/1990 | Ikegami | 372/73 |
| 4,939,744 | 7/1990 | Feldman et al. | 372/76 |
| 5,617,443 | 4/1997 | Ikegami | 372/74 |
| 5,887,008 | 3/1999 | Ikegami | 372/5 |

*Primary Examiner*—John D. Lee

[57] ABSTRACT

This disclosure relates to the production of coherent waves of electromagnetic radiation, especially of short wavelengths including X rays, in the form of pulses or continuous beams, utilizing mutually interacting beams of charged particles that include positive ions and electrons. The atoms of which the ions are formed exist in states of excitation energy by virtue of their ionization. The ions capture electrons as the two beams interact, thereby becoming capable of undergoing de-excitation and emitting characteristic electromagnetic radiation. When heavy elements and a high degree of ionization are involved, the radiation so produced can be of high frequency; often X rays. The radiation energies can be of large natural widths which make conditions favorable for the emissions to be composed into a coherent pulse or beam. Despite the extremely short life times of the excited states, the required level of population inversion of the laser medium can be achieved by a specialised approach; population inversion is generated in a limited region on the laser medium, a beam of highly positive ions, by flooding the region with electrons drawn out from an adjacent beam. The population so formed in a region is advanced along the medium, region to region, in synchronization with the progress of the coherent photons. A preferred mode of the invention that generates a coherent X ray pulse of 11.2 keV photons having an energy output of 3.6 J and a power rating 360 GW is described.

28 Claims, 4 Drawing Sheets

NOT TO SCALE

Z (OUT OF PAPER)

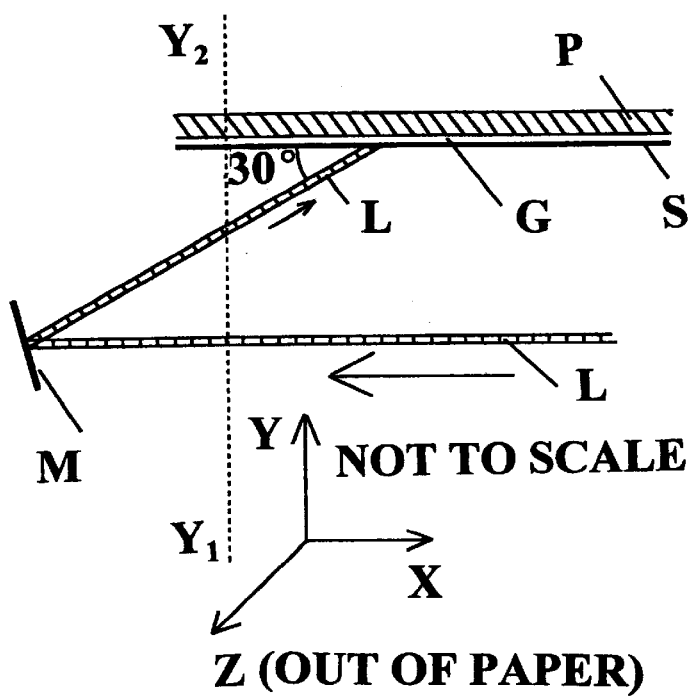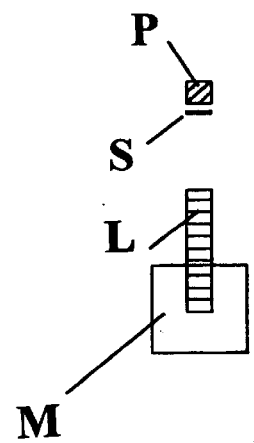
FIGURE 2(b)
FIGURE 2(a)

NOT TO SCALE

METHOD AND APPARATUS OF PRODUCING COHERENT HIGH-FREQUENCY ELECTROMAGNETIC RADIATION BY INTERACTING BEAMS OF IONS AND ELECTRONS

FIELD OF THE INVENTION

The present invention relates to the production of coherent electromagnetic radiation, especially radiation of high frequency including X rays, by the interaction of beams of electrically-charged particles.

BACKGROUND OF THE INVENTION

Electromagnetic radiation is emitted when an atom or molecule comes down from an upper to a lower energy state in accordance with the laws of quantum electrodynamics, conserving momentum and energy. In a laser, the best-known case of coherent electromagnetic radiation generated by atomic systems, this is made to occur as a resonance process via stimulation of excited atoms by incident photons having energy the same as that of the photons that result from the de-excitation. The demands of pumping, population inversion, stimulation, and multiplication of photon intensities without excessive losses, essential to the generation of coherent radiation can be met with relative straight-forwardness for radiation in the infrared and visible regions of optical frequencies. Various techniques were applied successfully in this effort that led to the development of lasers of a large range of wavelength. Special efforts further led to a variety of lasers and to lasers capable of very high power output. Several modes of soft X-ray lasers were built over the past years, with ionized vapors in the plasma state employed as the laser media. M. D. Rosen et al, Physical Review Letters, Volume 54, (1985), pages 106–109, describe an exploding foil technique of achieving such a soft X-ray laser. Despite such successes, generation of X-ray lasers has remained restricted to relatively low photon frequencies.

Production of lasers of increasingly higher frequencies is beset with rising difficulties. For example, A. V. Vinogradov and I. I. Sobel'man, Soviet Physics JETP, Volume 36, (1973), pages 1115–1119, give a presentation of the problems visualised of creating laser radiation sources in the far ultraviolet and X-ray regions. Energy-input demands are higher at increased radiation frequencies. Population inversion cannot be maintained for long enough periods because the rate of spontaneous emission relative to stimulated de-excitation increases as the third power of frequency of the emitted radiation. Only excited states of ultra short life times have large enough energy widths that provide adequate resonance cross sections for stimulated emission. Conventional reflection techniques do not apply for X-ray wavelengths. Consequent of these difficulties, the lasers built hitherto are limited to wavelengths over a few nm, which correspond to photon energies below about 1 keV.

In view of the great significance of X-ray lasers in science, technology, and medicine, persistent efforts continue to be undertaken for developing lasers operating at higher photon energies. In illustrating this, D. L. Mathews and M. D. Rosen, Scientific American, December 1988, pages 86–91, review various efforts undertaken in laboratories worldwide for producing X-ray lasers of short wavelengths. Also, W. T. Silfvast, Selected Papers on Fundamentals of Lasers, SPIE Milestone Series, Vol. MS 70 (SPIE Optical Engineering Press, 1993) presents a more recent account of such ongoing efforts.

SUMMARY OF THE INVENTION

The present disclosure envisages the production of coherent electromagnetic radiation, particularly of photon energies higher than 1 keV, based on the characteristic high-frequency emissions of atoms, especially the heavier atoms. The core levels of the atoms which account for such high-energy photons have remarkably short life times, often much shorter than a femtosecond, so that the levels have natural widths that are in the range of several eV's. In a medium of atoms which are fully or highly ionized, individual atoms allowed to interact with and capture low-energy electrons as proposed in the current disclosure may emit a cascade of photons representing the characteristic emissions of the ionized atoms, as the captured electrons tend to go into the lowest energy states available. If the ions that emit these photons are not having a wide distribution of velocities, the Doppler broadening of the radiation emerging in a specific direction can be small compared to the large line widths. Further, the energy shift of the emitted photon resulting from the recoil due to emission or absorption of the photon can be negligible relative to the line width. The recoil effect on the ion due to capture of a low-energy electron can be of similarly little consequence. These factors make the characteristic short-wavelength radiations of elements including X rays particularly amenable to resonance interaction, and likely subjects thereby for the production of coherent X-ray pulses or beams via the process of stimulated emission.

Among the crucial factors deciding on the usability of a certain element for production of coherent electromagnetic radiation of a desired wavelength are the energies of the characteristic emissions and their natural line widths. The line widths increase for the elements sharply with increasing value of the atomic number, and can be large for medium-heavy and heavy elements. For example, the energy width of the $K_{\alpha 1}$ line is known to be 11.2 eV for Sn, and 103 eV for U, the heaviest stable element (see Table 1). Thus, while uranium which provides the highest-energy characteristic radiations may be preferred for hard X rays of photon energy ~100 keV, other elements may also be usable while coherent radiation of lower-energy photons are sought.

TABLE 1

The photon energies and the natural line widths of two prominent characteristic emissions, $K_{\alpha 1}$ and $L_{\alpha 1}$, of selected medium-heavy and heavy elements.

| Element | Atomic Number | Emission Energy $K_{\alpha 1}$ | $L_{\alpha 1}$ | Line Width $K_{\alpha 1}$ | $L_{\alpha 1}$ |
|---|---|---|---|---|---|
| Ni | 28 | 7.5 keV | 0.94 keV | 3.0 eV | — eV |
| Se | 34 | 11.2 | 1.49 | 4.1 | — |
| Sn | 50 | 25.3 | 3.75 | 11.2 | 2.62 |
| Au | 79 | 68.8 | 11.61 | 62.5 | 7.85 |
| U | 92 | 98.4 | 17.45 | 103.0 | 12.40 |

In the present case, wherein lasing of the characteristic emissions of atoms especially arising from the core shells is aimed at, the demands on pumping effectively mean that the atoms of the medium must be highly or totally ionized. Ordinarily, when an assemble of atoms of an element are ionized by a conventional method such as thermal collisions or interaction with electrically-charged particles or supply of electromagnetic energy or any standard means, the ionization of the atoms is accounted for by the removal of outer electrons only. The removal of core electrons from the atoms, necessary to acquire a high degree of ionization is hard to achieve, especially while heavy atoms are targeted;

and requires an intensified application of any of the conventional techniques of ionizing atoms. Alternately it can be accomplished with good effectiveness by a direct process based on the in-flight annihilation of positrons. Intense levels of ionization in heavy elements can be made possible through this method. The method has been described in detail in a U.S. patent application filed by Jose C. Palathingal, pending consideration of the U.S. Patents and Trademarks Office (application Ser. No. 09/096,314 dated Jun. 11, 1998). The positron-annihilation process eliminates preferentially the core electrons of the atoms. The technique can be applied to heavy atoms with greater ease if they have been already ionized to lower degrees by a conventional technique.

A vacant core-electron level in an ionized atom can be filled by having an electron available for occupying the vacancy. An electron of a higher shell of the same ionized atom can move into the vacant level. Alternately, an electron can be transferred from another nearby atom or ion. A yet another possibility is that a free electron can be captured from the vicinity. In this disclosure, it is proposed that, in a preferred mode, capture of electrons into vacant states of ions be made possible by allowing the ions to interact with a high-density influx of electrons of appropriate energy.

In the method of the present invention, owing to the extremely short life times of the excited energy levels, and the consequent practical difficulty of obtaining and maintaining a large assembly of totally or nearly totally ionized atoms, a steady population inversion essential in the production of coherent radiation is achieved by special means. A photon traversing the laser medium can cause a stimulated emission from an atom in its path only if the instant of arrival of the said photon at the position of the said atom lies within the short life time of excitation of the subject atom. The effort is hence directed presently towards generating at a time, in a small region, a localised population inversion which may last there only very shortly, but such region of population inversion is made to shift continuously in a sequence, region to region along the length of the medium in synchronization with the advance of the stimulated radiation in the same direction. Thus in the present method, the provisional region of laser activity varies progressively along the length of the laser medium. A parallel approach was employed by John J. Shipman, Jr., Applied Physics Letters, Volume 10, (1967), pages 3–4, for deriving an increased power yield from neon and nitrogen lasers. In this approach, a wave of current excitation travels along the laser medium with a velocity matching that of stimulated emission.

An illustration may be made citing the case of the $K_{\alpha 1}$-characteristic radiation of atoms. Since the $K_{\alpha 1}$ radiation arises from the transition of a $L_{III}$ electron to a K level, the population inversion relevant to the $K_{\alpha 1}$ case is described as the state having one or more electrons occupying the $L_{III}$ level of the ions while the K shell has at least one vacancy. This description suggests that an inverted population can be made possible at any location of a medium of totally ionized atoms only provided that an adequate number of ions of the region capture electrons into the $L_{III}$ level. A captured electron can remain in the $L_{III}$ state for only a short period, typically $\sim 10^{-16}$ s or less for a medium-heavy or heavy element, before it is transferred into the K vacancy. It is hence imperative that in order that a stimulated $K_{\alpha 1}$ emission be possible from an ion, the said ion be found in the above-defined excited state when a photon of resonance energy interacts with it.

The method of this disclosure is hence outlined as follows. A limited small region of the laser medium consisting of ions in the form of totally or nearly totally ionized atoms is irradiated by an assemble of electrons located aside, forcibly deflected toward the laser medium by a progressive force field which can be electric or magnetic in character. The force field advances in the direction parallel to the laser medium so that region after region of the medium can be irradiated by electrons, the region being subjected to irradiation varying along the length of the laser medium from end to end at a required constant pace of time. The time interval between the instants that the electron influx hits the two ends of the medium is matched with the time of flight of photons between the ends. During the irradiation by the electrons, some of them are captured by the ions. The captured electrons end up in the lowest available vacancies, which are in the K shell in the case of totally-ionized atoms. Emissions are hence initiated at one end of the medium and some of the photons proceed in the direction towards the other end of the medium. The progress of electron irradiation and the corresponding continuous advance of population inversion from region to region along the length of the medium, governed by the speed of progression of the deflector field, is synchronized with the advance of these photons. A number of the photons moving along the medium are therefore likely to encounter ions immediately after electron capture, before spontaneous de-excitation of the ions could take place. This can initiate a chain process of stimulated emission that represents laser action in the medium.

Despite the possibility of creating stimulated emissions in a cascade process as afore-said, the actual feasibility of a coherent pulse or beam depends quantitatively on the relative magnitudes of the stimulated-emission cross section and the total cross section for photon scattering and absorption. Scattering and absorption are commonly dominated by atomic or electronic processes. If the medium is fully or very highly ionized, and no free electrons are present, the cross sections for varied scattering and absorption processes related to electrons can each be negligible or nil. Viewed quantum-mechanically, for example, an atom devoid of any electron cannot initiate the Compton-scattering process. Photoelectric absorption and the Auger effect also require that bound atomic electrons be available that can absorb photons. Coherent scattering by the whole atom is not present when the atom is fully devoid of electrons. However, coherent scattering by the nucleus via the Thomson or the Delbruck process can occur owing to the interaction of the photon with the nuclear field. This cross section can indeed be very small compared to the resonance cross section which accounts for stimulated emission. Coherent scattering by highly ionized atoms could have only a comparable role.

At resonance energy, the cross section for stimulated emission is given by the well known formula, $$\sigma_0 = (\lambda^2/2\pi) \cdot g \cdot \Gamma_i/\Gamma$$

wherein $\lambda$ stands for the photon wavelength. And, g represents the spin-statistical weight ratio, $\Gamma_i$ the partial energy width of the excited state for the transition of interest, and $\Gamma$ the total width of the state. Where a single photon transition dominates the decay of the excited state and non-radiative transitions are nearly absent, this ratio could be almost unity. When the incident photon energy, E is distinct from the resonance energy $E_0$, the cross section is reduced to $$\sigma(E) = \sigma_0/|1 + 4(E-E_0)^2/\Gamma^2|$$

In actuality, the effective average cross section, $\sigma_{eff}$ for stimulated emission is smaller than $\sigma_0$ because of broadening of the energy of the incident photon owing to various recoil and Doppler processes. However, in the case of characteristic high-frequency emissions of atoms, the variations in photon energy due to recoil-energy shift and Doppler effect can be each much smaller than Γ. In such a case, the maxiumum cross section $\sigma_0$ can become applicable.

Conditions of large stimulated-emission cross section and low photon absorption can be met by the method of the invention, a preferred mode of which is detailed below.

BRIEF DESCRIPTION OF THE DRAWINGS

FIGS. 2(a) and 2(b) illustrate (a) plan view and (b) a sectional view of the article beams and an externally-derived laser pulse reflected toward the particle beams by a fixed mirror. The illustration (b) is for view towards the left of section $Y_1Y_2$.

DETAILED DESCRIPTION OF THE INVENTION AND A PREFERRED EMDODIMENT

Figure 1:
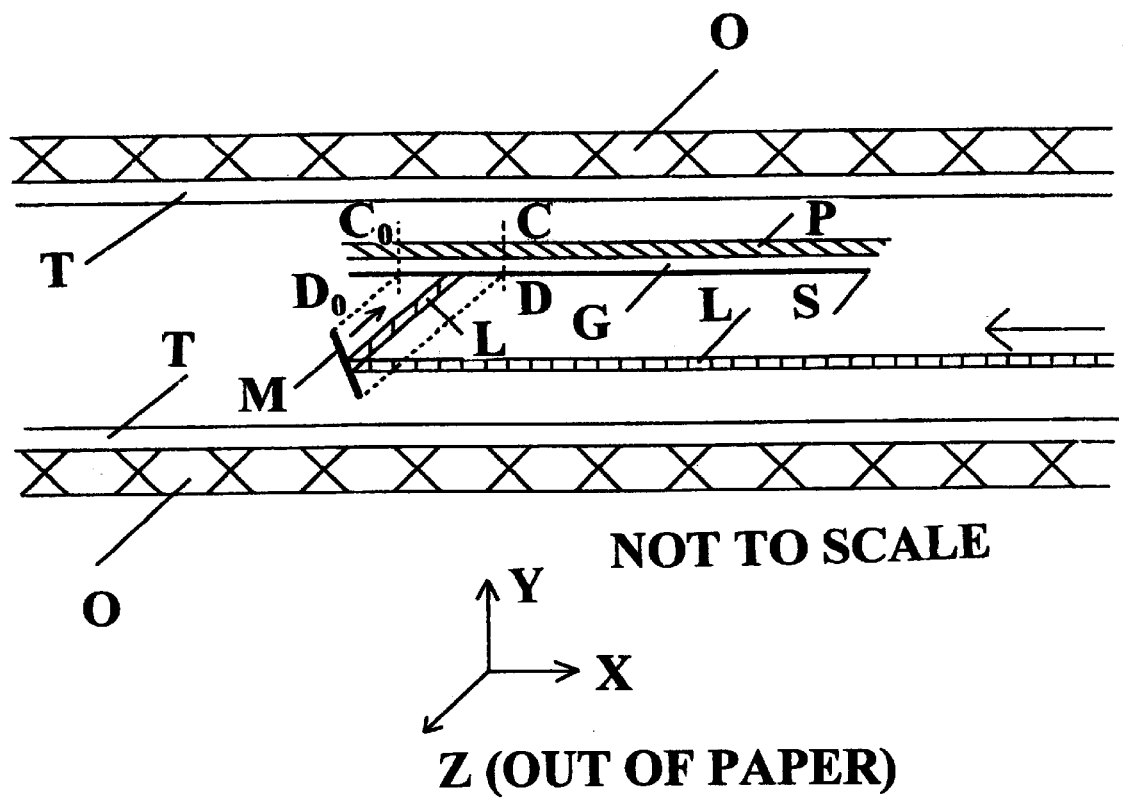
FIG. 1 is a plan view illustrating the transmission of two charged particle beams and an externally-derived laser pulse within an evacuated beam tube. A fixed plane mirror reflecting the laser pulse, and a superconducting solenoid wound over the beam tube are also shown.

A preferred mode of the method and the apparatus is now described citing a medium-heavy element, selenium which has atomic number 34 and mass 78.96 atomic units as the laser material.

T represents a high-vacuum tube of nonmagnetic material, (see FIG. 1), with a fixed axis of symmetry defined as the x direction. Two beams of electrically-charged particles, P and S are transmitted simultaneously through the tube along paths parallel to the tube axis. The beam P, hereinafter referred to as the primary beam, consists of totally-ionized monoenergetic selenium atoms and monoenergetic free electrons, and is composed of a plurality of beams of selenium ions and electrons which overlap over a specified path across a range of distance marked PP in FIG. 1. This composite primary beam has a square cross section, 0.1 mm wide in zx plane and 0.1 mm thick in the xy plane. In the preferred mode, the beam S, hereinafter called the secondary beam consists of free electrons and protons. It is also composed of a plurality of beams made to overlap over a specified path across a range of distance marked SS. This latter composite beam has a ribbon-like rectangular cross section of width 0.1 mm parallel to the zx plane and thickness $10^3$ A° along the xy plane. The two composite beams, the primary and the secondary, thus have a pair of sides of width 0.1 mm mutually parallel and facing each other. They are separated by a gap G of width 1500 A°.

In the preferred mode, the net electric charge of each of the two composite beams is set zero. Also, the net electric current of each beam is made zero. By having the net charge zero, the presence of net electrostatic repulsive force within the particle confines is avoided. Thus, the number density of electrons in the primary beam shall be set to be 34 times larger than that of the Se ions. The kinetic energy of the selenium ions is 34.0 keV and that of the electrons 1.631 MeV. The Se ions all move in the same direction, left to right according to FIG. 1. With close to 50.05% of the high-speed electrons moving in the direction the same as of the Se ions, and the rest, slightly fewer, moving in the opposite direction, the net current of the primary beam is made zero. It may be noted here that at the set ratio of energies of the Se ions and electrons, the momenta of the particles are proportional to their charges, so that the relatively heavy ions and the light electrons can have the same curvature of motion in any common transverse magnetic field. With the net electric current of the beam zero, no self-generated magnetic field loops surround the beam, which may tend to reshape the beam through the pinch effect. The secondary beam is constituted to provide for a net charge and current both zero, by having the total numbers of electrons and protons in the beam equal, and equal numbers of electrons passing in opposite directions, and, similarly, equal numbers of protons passing in opposite directions. Both types of particles are of kinetic energy 100 eV. This composite beam of low-energy particles also is free of any self-generated pinch effect.

It is to be particularly noted here that the two particle beams, being composed of oppositely-charged atomic constituents, can lose intensity by recombinations and collisions. Recombination losses are not expected to be significant however since the kinetic energies of the electrons that are constituents of the primary and secondary beams are too high to present large electron-capture probabilities for the respective positive ions of the respective beams. Applying a longitudinal magnetic field over the beams can help in reducing particle losses by collisions. In the preferred mode, this field has a strength 10 T, and is created by an electric current passed through a superconducting solenoid symbolically represented by the coil o wound over the beam tube T (FIG. 1).

The production of coherent radiation shall be based, in the preferred mode, on the $K_{\alpha 1}$ emission of selenium, to be undertaken utilizing a linear section of the primary beam. This section, marked $C_0D_0$ in FIG. 1, is referred to hereinafter as the laser medium. The process of population inversion is initiated at a small region around $D_0$ of this column by deflecting electrons from a small region around D of the secondary beam towards a small region around $D_0$ by a transverse electric field or field component acting along the y direction. The field is oscillatory and progressive, travelling in the direction D to C at the speed of electromagnetic waves. The field vector polarizes the secondary beam containing electrons and protons, and causes transverse charge displacements, resulting in charges being expelled in opposite directions. Electrons can thus be propelled towards the laser medium containing Se ions, and irradiate the ions. The progression of the field causes the region of irradiation advance along with the field. The electron-capture process initiated at $D_0$ is thus moved steadily to the end $C_0$ at a pace that causes the photons from the initiating region around $D_0$ arrive at any region along the length of the ion column in synchronization with the development of population inversion in the region.

Figure 3:
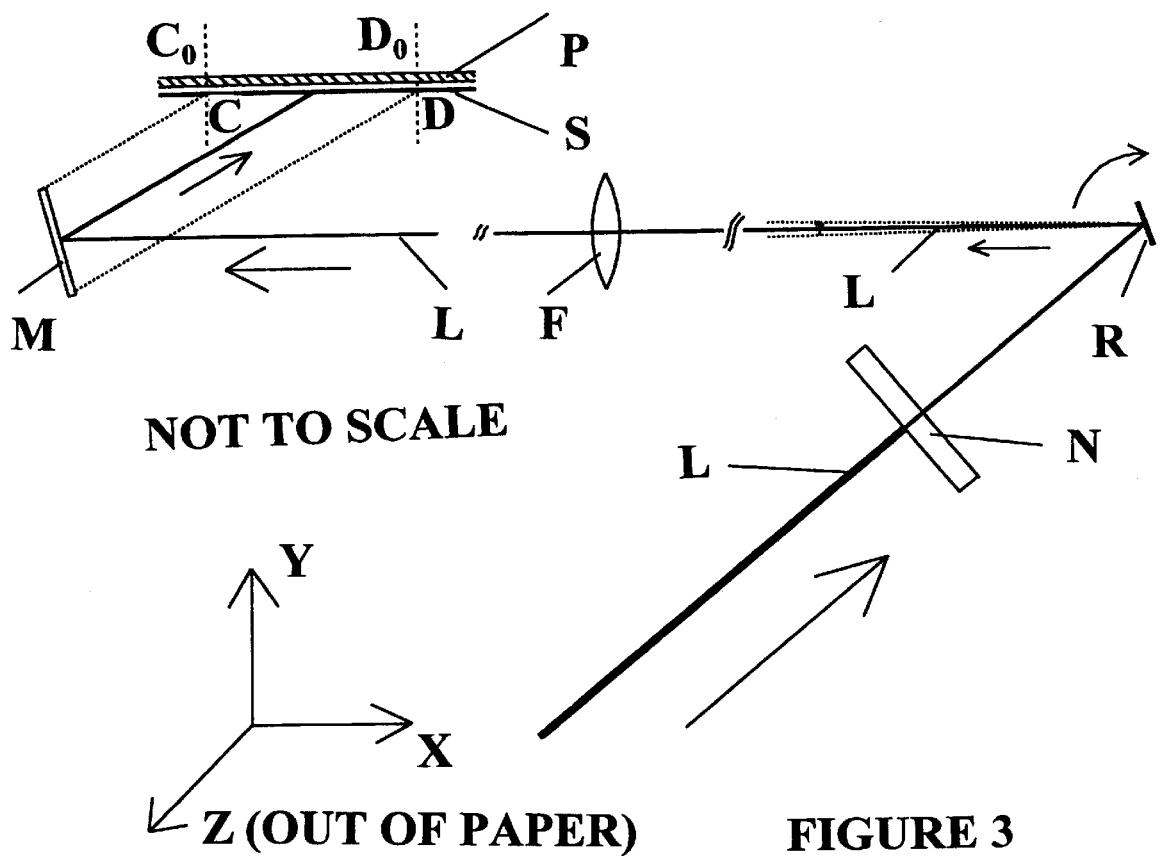
FIG. 3 is a plan view of a setup including a rotating mirror and a fixed plane mirror that enables an externally-derived laser pulse be swept through a pre-determined range of directions. A slit defining the input pulse dimensions and a device that focusses the pulse are also marked.
Figure 4A:
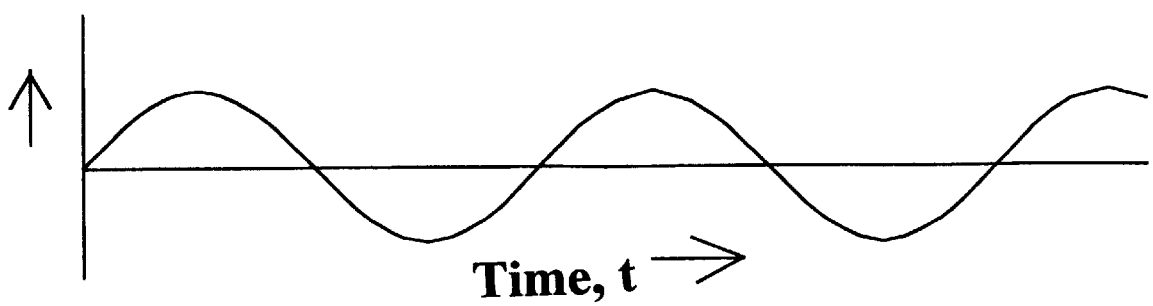
FIGS. 4(a)–4(d) illustrate graphic sketches representing the time-dependent variation of (a) the electric field "E" of a constant-intensity laser pulse in the plane of polarization, (b) the acceleration "a" of a free electron under the influence of the field, c) the velocity "v" gained by the electron, and (d) the deflection "y" of the electron caused by the field.
Figure 4B:
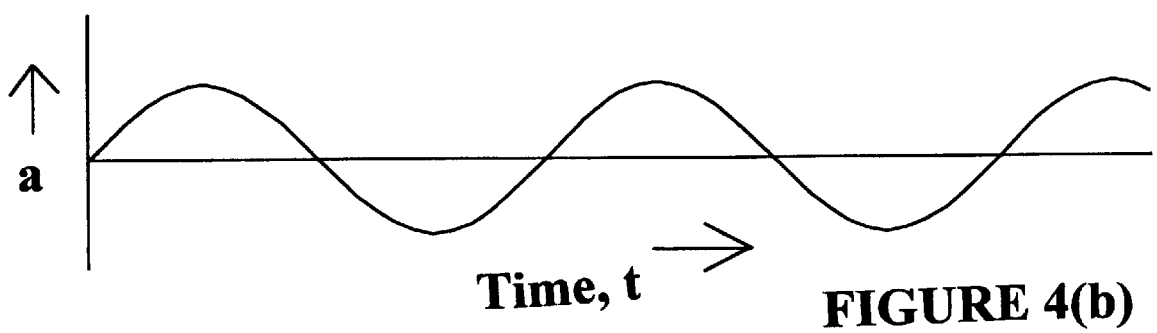
Figure 4C:
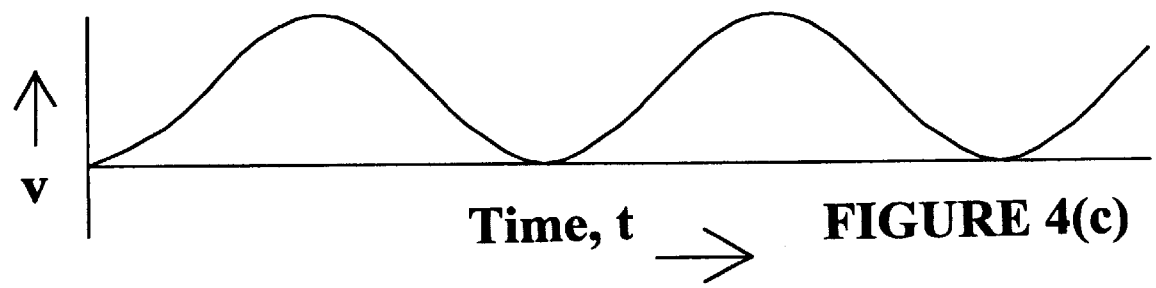
Figure 4D:
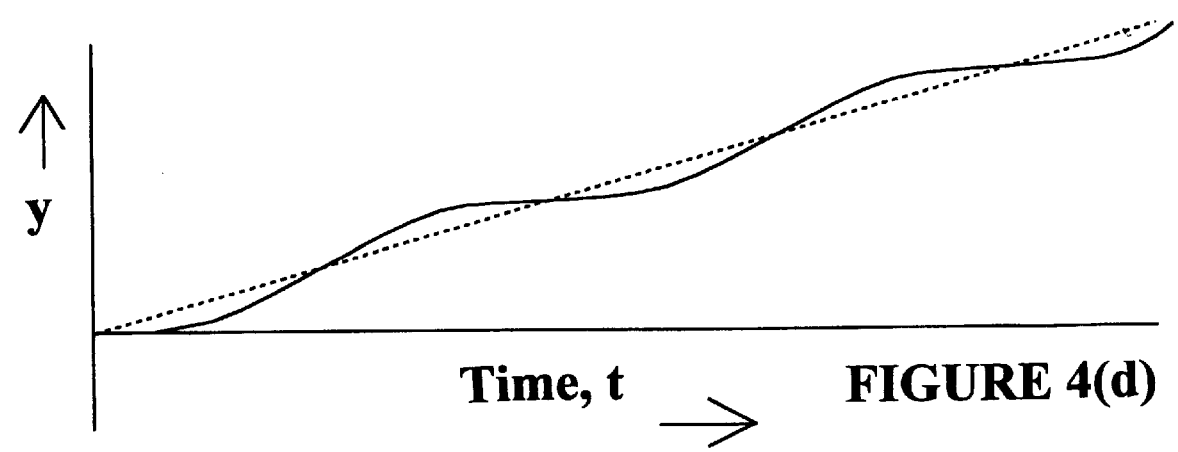

The required electric field can be generated, in principle, by any known method of producing a progressive electric field of the required strength, including a plane-polarized laser beam. In the preferred mode, provision is made to have a powerful externally-derived laser pulse denoted L (see FIG. 2) to be swept over at the speed of light along the length of the secondary beam, incident at 30° inclination on the 0.1-mm wide broad side facing away from the primary beam. This laser pulse is of an infrared wavelength of approximately 106,000 A°. The geometrical cross section of the pulse is defined by a 3 mm×3 mm slit N (as in FIG. 3). Diffraction broadens the cross section, but the pulse is refocussed by a double-curvature focussing device F into a reduced rectangular cross section 0.1 mm×0.05 mm before being incident on the secondary beam. With the angle of incidence 30°, a narrow section of the beam, 0.1 mm×0.1 mm, is exposed to the laser pulse at a time. The sweep of the pulse is made possible by means of a fast-rotating plane reflector, R rotating at a precise pre-determined speed. In the preferred mode described herein, the laser pulse is incident along the direction NR and reflected by R towards a fixed plane mirror M, which directs the pulse to a point on the section DC of the secondary beam, S. In this mode, the beam sections DC and $D_0C_0$ are of length 20 cm. For its entire path, the travel plane of the incident laser beam is parallel to the xy plane. The rotational direction of the mirror R is such that the point of laser incidence on the secondary beam moves in the direction D to C. The fixed mirror M is located near to the beam section DC. The rotational speed required is determined by the path lengths of the laser beam, and the angles of incidence of the beam on the fixed mirror M and on the secondary beam. The distance RM is taken as 200 m. Accordingly, the rotational speed of the mirror R is about 60 kHz. With curved mirrors substituting for plane mirrors, the rotational speed required can be greatly reduced. The mirror supports are required to be strong enough to be able to absorb the momentum impulse generated by the reflection of the incident radiation. By ensuring that the radiation is incident on the surface of the rotating mirror symmetrically about its axis, development of a torque that may affect the rotational movement can be avoided.

The plane of polarization of the laser pulse L shall be parallel to the xy plane. The amplitude of the oscillating electric field of the laser pulse should be large enough so that the electrons of the secondary beam may achieve an adequate transverse speed within a time interval of one half wave period and proceed to be injected well into the primary beam. At a kinetic energy 300 eV, the electrons have a speed $10^9$ cm/s, and shall be able to penetrate the ion beam adequately. The intensity of the laser pulse is hence preset, as detailed subsequently, to enable the electrons receive adequate kinetic energy so that they move on outward with an average speed $10^9$ cm/s.

The density of selenium ions in the primary beam P that constitutes the laser medium is set to be $2 \times 10^8 / cm^3$. Correspondingly, electrons of the beam have density $6.8 \times 10^9 / cm^3$. Thus, the beam contains $2 \times 10^{14}$ ions and $6.8 \times 10^{15}$ electrons per cm length. The secondary beam provides the low-energy electrons to be captured by the Se ions of the primary beam, and the required electron density of the secondary beam shall therefore be determined on the basis of the probability of electron capture per Se ion. Reliable experimental data on the capture of electrons by highly or totally ionized atoms applicable to the present case are not available. A rough estimate is made herein however from classical and semiclassical considerations. This is done by considering the probable capture of a free electron by an ionized atom into a vacant atomic shell, the free electron having kinetic energy much less than the kinetic energy the electron would have if captured into the shell and established a stable orbit. It is assumed for simplicity that, in a collision with an atomic nucleus, if the finite time such an electron spends within the orbital distance of a particular shell of the atom is equal to at least one period of orbital revolution, the electron will be captured into the orbit. For lesser time spent in the vicinity, the capture probability is proportionately less. The collision frequency is obtained by an approach analogous to the kinetic theory of gases. The L-orbit radius of a selenium atom is roughly 0.06 A°, and the period of revolution of the L electron of the Se atom is $1.6 \times 10^{-18}$ s. It takes $\sim 1.2 \times 10^{-18}$ s for an electron of kinetic energy 300 eV to traverse past an ion within the proximity defined by the L radius. Based on this approach, the minimum electron density required of the secondary beam so that a Se ion of the primary beam may have a 20% chance of capturing an electron into any of the eight L subshells directly per time interval $1.6 \times 10^{-16}$ s, the life time of a K vacancy while the L shell is fully occupied, is determined to be $\sim 2 \times 10^{23} / cm^3$.

Together with the protons which shall have the same numerical density as the electrons, the secondary beam constitutes a high-density plasma, electrically neutral as a whole. The dense composition of the secondary beam demands that the incident infrared laser pulse shall have a correspondingly high energy density, so that the electrons may pick up average energy $\sim 300$ eV in one half wave period as the pulse traverses the beam. Compared to the electrons, the protons absorb little energy. Owing to the high particle density involved, it is expected that the net energy absorbed by the particles can be rapidly redistributed. Estimates show that, with radiation losses included, the required minimum energy of the laser pulse at incidence shall be roughly 40 J per cm length. The corresponding power rating is $\sim 1.2$ TW.

The electric field of the intense infrared laser pulse propels electrons out of the secondary beam in either lateral direction depending on the phase of the wave front at incidence (see FIG. 4). Because of their larger mass, the protons are not projected significantly beyond the confines of the beam. During the first wave period after the wave front is incident at a point on the secondary beam, a batch of electrons of the beam are deflected laterally towards the primary beam. The field begins to be reversed at the end of a half period, but the electrons shall continue to move on, although with reducing speed (FIG. 4c). By the end of a full period, the velocity is reduced to zero. The velocity is not however reversed during a full cycle, but undergoes a periodic variation, going from zero to a maximum and back to zero. The next wave period shall hence advance the electrons into the medium still further (FIG. 4d). It is assumed herein that the laser-pulse intensity remains constant. If however, the electric field is attenuated significantly by energy absorption during the first period, the electrons could continue to move on thereafter with a speed reduced little from the maximum acquired during the initial time interval. In the preferred mode, at the incident energy 40 J/cm, the beam intensity is reduced by only about 5% within the first half period. Hence, for simplicity, it is assumed that the electrons continue to move on with an average speed $10^9$ cm/s. It is to be expected that an equal number of electrons are deflected in the reverse direction. Secondary effects are ignored in this picture, including the effects of interaction of the nonuniform transverse magnetic field of the laser pulse with the moving electron charge and the electron magnetic dipole moment. Since the speeds of the electrons and protons of the secondary beam are much smaller than the speed of light, the magnetic field vector has a considerably lesser role on the motion of these particles compared to the electric field vector.

The probable role of external fields such as magnetic confinement fields that may be part of the system maintaining the particle beams and may extend into the region of the present apparatus, not specified in this disclosure, is not discussed herein; but is not expected to be an unavoidable hindrance to the technique of the invention.

Among the toughest problems to be normally expected in the production of high-frequency coherent radiation shall be the huge pumping powers required for creating a population inversion, and removing the heat produced in the laser medium. In the present method, the laser medium consists of totally or nearly totally ionized atoms, and the process of production of coherent radiation involves flooding the medium with low-energy electrons at very high densities which may, in principle, generate a significant amount of heat over the medium having only a minuscule heat capacity. The build up of thermal energy can result in a total or a partial disruption of the beam in the irradiation region and consequently in total stoppage or reduction of coherent photon emission. This aspect of adverse thermal effects over the primary beam therefore needs to be looked into quantitatively.

Collisions occurring between the incident 300-eV low-energy electrons of the secondary beam deflected into the primary beam and the Se ions of the primary beam involve little energy transfer, and although several collisions are involved within the time period $\sim 10^{-14}$ s over which a selenium ion is subjected to irradiation by the electrons, the net energy exchange could be only $\sim 1$ eV, quite small compared to the kinetic energy of the ions; and of little consequence as revealed subsequently.

The energy transfer involved in collisions between the 1.631-MeV electrons of the primary beam and the incident 300-eV electrons could be approximately estimated on the basis of an analogy with the loss of kinetic energy of 1.631-MeV electrons in transit through a solid material medium of light atoms. The electron density for such an atomic medium is $\sim 10^{24}.cm^{-3}$, several times larger than the incident density of low-energy electrons. The specific energy loss for electrons of energy 1.631 MeV is $\approx 1.5$ keV/mg.cm$^{-2}$ for the medium. The effective distance a primary-beam electron travels through the dense cloud of low-energy electrons of the irradiation region depends on the dimensions of the irradiation region at a time. The average electron density that the primary beam is being flushed with in the irradiation region at any particular instant of time is around $10^{23}/cm^3$, and the effective average distance across which a 1.631-MeV electron has to transit under irradiation by the incident low-energy electrons is $\sim 3 \times 10^4$ Å. Accordingly, the 1.631-MeV electron is subjected to an average net energy loss $\sim 1$ keV in collisions with a large number of low-energy electrons. This energy transfer shall not be expected to significantly affect the motion of the Se ions of the region of population inversion and be a hindrance to the production of coherent photons from the region.

The primary beam may absorb energy from the infrared laser pulse that emerges from the secondary beam with attenuated intensity. The heavy Se ions pick up little kinetic energy, but the 1.631-MeV electrons of the beam may be expected to receive substantially more, $\sim 100$ eV. As stated above, a modest variance of the energy of these electrons is not expected to be a hazard of consequence.

Thermal energy can be built up in the primary beam, the laser medium by absorption of a part of the large flux of low-energy photons generated by the acceleration that the charged particles of the two beams may undergo. However, few of these photons can be absorbed inelastically in the laser medium as no appropriate quantum states are available in significant numbers. Elastic collisions of these photons can produce little energy transfer. Photons generated during electron captures by the Se ions can also contribute to the build up of thermal energy in the primary beam. But these photons are relatively few and the thermal contribution is not expected to be large.

Overlap between the time instant when a photon emitted by a Se ion arrives at the position of another Se ion of the laser medium and the duration for which the latter ion is found in the required specific state of population inversion is crucial in achieving a viable yield of coherent photons. There can be variations in the duration of interaction of an ion with a low-energy electron prior to capturing it, and in the interval an ion may remain in the excited state before being spontaneously de-excited. The incident low-energy electrons may arrive at any particular depth within the laser medium after a degree of straggling caused by interactions with the ions and electrons present in the medium. This straggling increases as the electrons penetrate deeper. Besides affecting the probability of capture, unregulated propulsion of electrons could lead to erratic intensity and timing of irradiation. Such factors need to be taken into account in estimating the effective degree of time synchronization at a region between the incoming photons and the build up of population inversion.

The time-jitter between the occurrances of the two independent events, emission of a first photon by a Se ion at one point of the laser medium and the subsequent stimulation emission of a second photon by another ion located at another point promoted by the oncoming first photon, both governed by a common time constant, lowers the degree of synchronization between the two events. This may be accounted for by a net reduction factor $\approx \sqrt{2}$ in the estimate of the effective population density. The varied features of erratic irradiation cited above could be taken into account in principle in terms of other reduction factors over the effective population density. For a thin layer at the surface of electron entry into the primary beam, the laser medium, these individual reduction factors may not be large, and a combined factor 2 may be accepted as allowing for all the varied effects. The net reduction factor is hence taken as $2\sqrt{2}$; roughly as 3. This net factor may be expected to increase for layers of the laser medium at greater depths of electron penetration. On the other hand, the density of inverted population may tend to rise with increasing depth owing to the reduced speed of the electrons and the corresponding rise in electron-capture probability. It may hence be assumed for simple calculations that the net effective inverted population density is constant across the thickness of the laser medium within the range of the incident low-energy electrons. This range is estimated to be $\approx 0.1$ mm; the full thickness of the primary beam. Thus the production of coherent photons occurs over the whole laser medium.

Free electrons may be captured into the $L_{III}$ subshell directly or via any one of the higher shells. As the captured electrons move downward from levels above $L_{III}$ into the lowest available vacant state, a large number are bound to transit through the $L_{III}$ level, which accounts for a significant fluorescence-yield factor among the L-X ray series. This effect of the upper shells which could somewhat contribute to the production of coherent photons is however not considered because captures into electron levels above $L_{III}$ are expected to be relatively few due to the kinetic energy $\sim 300$ eV of the incident electrons. Many of these cascades may further involve time delays considerably larger than $1.6 \times 10^{-16}$ s, the life time of the state of inverted population of the present case. Direct capture of electrons into the K shell from shells higher than the L shell and from the continuum is also ignored. These capture events may lower the degree of available population inversion, but the occurrance rate of these events too shall be small; estimated to be roughly 5% of the rate of capture into the L shell.

The effective cross section for stimulated emission, $\sigma_{eff}$ is reduced by shift and broadening of the incident photon energy. The shift arises from ion recoil at photon emission, and the broadening from Doppler effect generated by velocity spread of the ions. Each of the major factors is considered below, and recognised to be not a serious problem in the method of the invention.

The natural width of the $K_{\alpha 1}$ line of selenium having photon energy 11.2 keV targeted presently for the production of coherent radiation is 4.1 eV. The actual figures are somewhat different because the electron-screening effect of atoms that gives rise to differences in energy levels and level widths between ions and atoms is not considered herein. The recoil energy of emission of a 11.2-keV photon by a Se ion is only $8.5 \times 10^{-4}$ eV, far smaller than the line width, 4.1 eV, so that the effect of this recoil on the cross section for stimulated emission can be ignored.

A Se ion can be subjected to recoil on account of the capture of a 300-eV electron incident on it. This may lead to a variation in the velocity vector of individual ions. The ions could undergo a broadening of velocity owing to various collision processes also. Each process contributes to the Doppler width of the emitted photons. In order to evaluate the extent by which an individual process of Doppler broadening affects the resonance cross section, a criterion is set in terms of an energy width fraction defined as $\Gamma/E_\gamma$, wherein $\Gamma$ is the natural width of the $K_{\alpha 1}$ line of selenium and $E_\gamma$ is the $K_{\alpha 1}$-photon energy. This fraction has value, $3.66 \times 10^{-4}$ in the present case. If a recoil or scattering process results in a velocity shift the ratio of which to the speed of light is much less than the width fraction cited above, the corresponding Doppler effect has only negligible effect on the resonance cross section. Following this approach, the recoil of a Se ion resulting from the capture of a 300-eV electron is expressed in terms of the ratio of the recoil speed $v_{re}$ to the speed of light c as $v_{re}/c$, which has the value $3 \times 10^{-7}$. It is thus evident that the recoil involved herein has little effect on the cross section of interest. It is also evident that a single collision event involving a Se ion and a 300-eV electron can have no significance. Multiple collisions that can occur also cannot have a serious effect since the number of such collisions that an ion may go through before a stimulated emission may occur during the period of electron irradiation, although substantial, is not large enough. The collisions the Se ions may undergo with the high-energy electrons that too are constituents of the primary beam also need to be considered. A head-on collision between a 1.631-MeV electron and a 34-keV selenium ion can produce only a 6 percent change in the momentum of the ion. The speed $v_i$ of a 34-keV selinium ion is given by $v_i/c = 9.6 \times 10^{-4}$, and thus the maximum Doppler shift a collision as above can produce is of a small factor, $6 \times 10^{-5}$, significantly smaller than the width fraction of the photon. Such collisions are also rare; at the electron density of the primary beam, $6.8 \times 10^{19}/cm^3$, the mean free path for such ion-electron collisions in which the electron-scattering angle is 90° or larger is found to be roughly 5 m. Small-angle scatterings are much more abundant, but their net effect is only comparable. Although the differential cross-section for small-angle scatterings increases as $\sin^{-4}(\theta/2)$, wherein $\theta$ is the angle of scattering, consideration of the solid-angle factor $\sin(\theta)$ and the transferred momentum component shall show that the net velocity spread arising from the large number of random small-angle collisions is only of the same order as for collisions involving large angles. Ion-ion collisions do not cause a significant velocity spread either. Despite the large cross sections involved, that can be calculated using the Rutherford formula, ion-ion collisions may occur only as a second-order effect as they depend on the presence of a relative velocity between the ions. Such a relative velocity can be developed by and large only through the collisions involving the 1.631-MeV electrons, and is small as seen above. With all varied processes considered, involving other ions, electrons and photons, the maximum possible randomized variation in the kinetic energy of a Se ion is found to be less than ~10 eV. The random energy is equivalent to thermal energy, and the resultant effect may be expressed by a thermal speed ratio, $V_{th}/c$. At 10 eV, the ratio is found to be around $1.6 \times 10^{-5}$, too small to be significant. In fact, any thermal energy of the Se ions less than 1 keV produces negligible broadening of the photon energy in the present case.

The above considerations reveal that the photon energy shifts and broadening resulting from various processes, collisions, thermal effects, etc. are small enough not to reduce significantly the resonance cross section from the theoretical maximum value. The wavelength, $\lambda$ of the 11.2-keV $K_{\alpha 1}$ emission of selenium being 1.107 A°, this maximum value of the resonance cross section $\sigma_0$ is $3.9 \times 10^7$ b. Despite this large value of $\sigma_0$, determining the availability of coherent photons from the method requires an analysis of photon absorption processes and the density of population inversion in the medium.

With only captured electrons present in the Se ions, the atomic absorption processes can be small; accountable to the air molecules left over in the high-vacuum beam tube at a finite pressure and to the few captured electrons present in the Se medium. At the residual air pressure, $10^{-9}$ torr presumed for the beam tube in the preferred mode, air molecules have a density $\approx 4 \times 10^7$ atoms/cm³. The total absorption cross sections for nitrogen and oxygen are around 100 b per atom at 11.2-keV photon energy. Thus at the molecular density referred to above, far too small compared to the ion density of the beam, the air molecules can have little role in photon absorption. Photon absorption by the bound electrons can be more significant and calls for a closer analysis.

Bound states can be formed in the Se ions by capture of the 300-eV electrons into the K or L shells, etc. The 11.2-keV $K_{\alpha 1}$ photons do not however have adequate energy to displace K electrons from the Se ions beyond the L shell; into higher shells or the continuum. These photons may however be capable of electron ejection from the L and higher shells by the photoelectric effect or the Auger process. Since this mode of photon absorption is accounted for predominantly by the L electrons and the cross section per electron is only a very small fraction of the maximum resonance cross section, the overall photon absorption caused by the bound electrons is negligible. The Thomson cross section accounting for photon scattering by the selenium nuclei, estimated as described earlier is $\sim 10^{-5}$ b, also too small to be significant. Coherent scatterings by Se ions having one or a few captured electrons could be rare events only, and may be ignored. Compton scatterings from the 1.631-MeV electrons which have a 34-times larger numerical abundance than Se ions in the medium is more substantive. The cross section per free electron calculated on the basis of the well known Klein-Nishina theory is 0.64 b. With the electron density taken into account, this corresponds to a mean free path ~250 m, much longer than the laser medium. Higher-order processes such as inverse bremsstrahlung are ignored as being only rare events. Thus, interactions with high-energy electrons are not expected to cause significant photon absorption.

The low-energy electrons injected into the laser medium and are present in large numbers may contribute to scattering of the 11.2-keV photons significantly. These electrons can be present in the region of irradiation at a density, $2 \times 10^{23}/cm^3$ Since electrons are dispersed to either side of the secondary beam, the average effective density is half the above. In effect, the presence of these low-energy electrons turns out to be the foremost factor of photon absorption which corresponds to an absorption length 16 cm. Accordingly, the photon intensity can be reduced by a factor 2 over a medium length 11 cm.

The electron density flooded through the primary beam is expected to be adequate to enable 20% of the ions capture an electron into the L shell within $1.6 \times 10^{-16}$ s. It is considered that roughly 50% of the events are accounted for by the $L_{III}$ subshell. Taking into consideration the average net reduction factor 3 assumed above and the dispersal of irradiation electrons to either side of the secondary beam, an effective inverted population $\approx 1.7\%$ may be assumed. This means that as electron irradiation advances along the length of the medium in synchronization with the advance of de-excitation photons, 1.7% of the ions in the path of a photon travelling parallel to the length of the medium are seen to be with an electron in the $L_{III}$ level and a vacancy in the K shell. Since, as seen above, the electronic absorption is modest and the line broadening is small compared with the natural line width, the effective cross section for stimulated emission, averaged over all the ions in the path of coherent radiation $(\sigma_{eff})_{av}$ is $6.6 \times 10^5$ b. A mean length of the medium over which the intensity of the coherent radiation may increase by a factor $e^1$, termed amplification length may be obtained. For the present case, the amplification length is 7.6 mm. With atomic absorption taken into account, the effective amplification length is 8.0 mm. Accordingly, the medium length over which the laser intensity could double is about 5.5 mm. This result is quite satisfactory even while considering that the estimate has been only rough. The ratio of the absorption length to the amplification length shall be expected to remain fairly constant over variations of the electron-irradiation density of at least one order of magnitude. However, since the absorption length is primarily dominated by the incident density of low-energy electrons derived from the secondary beam, an increase of Se ion density of the primary beam by some numerical factor, while retaining the incident electron density unvaried, shall result in a reduction of the amplification length by roughly the same factor.

Whereas the above considerations reveal that production of coherent radiation by this approach can be possible, despite a number of greatly demanding technical criteria that needs be met, the intensity of the coherent radiation produced depends additionally on a number of factors.

In common with other lasers, the geometry and length of the lasing medium are extremely important. To make an estimate of the intensity of the coherent X-ray beam produced in the mode described, the laser medium, having length 20 cm and width 0.1 mm and thickness 0.1 mm, wholly effective in the production of coherent radiation, may be viewed as a series of thin linear parallel strips adjoining one another. The strips, 20-cm long, may all be considered to have width 0.1 mm, the same as of the medium, and thickness 16 A° which corresponds to the depth of penetration of the 300-eV electrons in $1.6 \times 10^{-16}$ s, the life time of the state of population inversion. For each of these strips, thus having dimensions 20 cm×0.1 mm×16 A°, it may be assumed that the population inversion advances along its length in synchronization with the advance of photons. The number of Se ions in a single strip is $6.4 \times 10^{10}$, of which 1.7% may be considered as being in the state of population inversion along the transit path of coherent photons.

With a 0.1-mm long section of the secondary beam under irradiation by the incident laser pulse at a time, the total duration of irradiation at any point of the medium is approximately $3.3 \times 10^{-13}$ s. It is however to be expected that the duration of production of coherent photons from any section of a particular strip of the laser medium shall be essentially limited to the time of passage of the 1000-Å wide band of incident 300-eV electrons across the strip. Accordingly, the duration of emission of radiation is limited to an estimated $\sim 10^{-14}$ s. It is also to be expected that the intensity of emission from each strip may not be constant over this duration. Further, each of the strips begins contributing in a sequence with mutual delay, the deeper-lying strips beginning to radiate only later.

Coherent wave trains may be initiated by a photon generated by spontaneous emission by a Se ion located at any point in a strip. The fractional value of the solid angle presented by the end window of the strip at $C_0$ for a point near the opposite end is only $3.2 \times 10^{-13}$. Consequently a photon produced at the start region $D_0$ via spontaneous emission has an extremely low probability of being emitted in the direction towards the exit window. Per effective amplification length 8.0 mm of the laser medium, the estimated maximum number of photons that can be spontaneously emitted from within the corresponding medium volume, 8.0 mm×0.1 mm×0.1 mm, is $\sim 3 \times 10^{12}$. Consideration of the two K vacancies of the Se ion raises this estimate. Thus it is seen that on the average, one of these photons, thus initiated from a 8.0-mm long section of the laser medium at the start end of the medium, emerges through the exit window in the direction parallel to the medium. Such a wave train as is originated by this photon has the potential to carry the maximum number of coherent photons and be of maximum length. Wave trains initiated from points closer to the exit window shall have greater probability of emerging from the window, but may be composed of only fewer photons. The corresponding pulses carry only less energy and are of shorter durations.

The number of Se ions that are raised to the state of population inversion in a single strip per time interval, $1.6 \times 10^{-16}$ s is roughly $4.4 \times 10^7$ per amplification length; which corresponds to $3.0 \times 10^7$ per intensity-doubling length 5.5 mm. For rough estimates, it may be considered that the coherent photon yield increases geometrically with medium length initially, and linearly thereafter. The length over which the geometrical multiplication may occur is limited in the presently described mode of the invention to 14 cm. A single wave train initiated at the start end exiting through the window may hence be composed of a maximum of $3.6 \times 10^8$ photons.

Since the irradiation period at any point in the laser medium is $10^{-14}$ s, the duration of transit of the deflected electron beam of width $10^3$ Å across the point, an inverted population density 1.7% estimated earlier lasts in every region for the above-stated period. Since this total duration is sixty times larger than the natural life time of the state of inverted population, adequate time is provided for every ion to go through the state of inverted population once on the average. The total number of 11.2-keV photons hence emitted by the medium is roughly the total number of ions in the medium, namely, $4 \times 10^{15}$. A substantial fraction of these form part of coherent pulses, although only a smaller fraction emerges through the exit window. Simplified considerations give the number of coherent photons emerging from the exit window to be $\sim 2 \times 10^{15}$ photons. The radiated energy is 3.6 J. The radiation is expected to emerge over a period $\sim 10^{-11}$ s, the duration of transit of the low-energy irradiation electrons across the thickness of the laser medium, 0.1 mm; not considering the reduction in the speed of the electrons as they progress inside the laser medium. The average power radiated from the window is hence ~360 GW.

In the mode described herein, the frequency of the coherent radiation measured by a stationary detector is expected to be somewhat smaller than the emitted frequency on account of the negative Doppler shift produced by the motion of the 34-keV selenium ions. The Se ions are described herein as moving left to right (FIG. 2) whereas the coherent photon pulse is progressing in the reverse direction. The speed of the ions is given by the ratio, $v_i/c = 9.6 \times 10^{-4}$. It is hence seen that a finite degree of tunability of the frequency of the coherent radiation can be achieved in the method of the invention by providing for variation of the ion speed. By employing mono-energetic ions of greater variable speed, the degree of tunability can be enhanced. Relativistic heavy ions, for example, could provide coherent high energy photon beams of a large degree of tunability. By having the ions and the photons proceed in the same direction, coherent photon beams of frequencies higher than the emitted frequencies can be derived.

In the description above, a particular mode has been illustrated. However, the present invention is not to be construed as being limited by the features of the said mode as described herein. Other modes of the invention are possible by making such variations as are known to those familiar in the art. Illustrative examples are cited below.

Variations may be made to enable the laser of the invention to have a continued output, or a pulsed output of which the pulse could be of any required duration.

Coherent radiation may be made by the present method based on any characteristic line of any chosen element or composites of elements; including X rays.

The particle beams could have alternate constituents, and be in alternate chemical or physical forms or states. The beams may be produced by any one or more of various methods. Different methods of beam confinement and preservation may be engaged. The particle beams could be of alternate geometric configurations, or of cross sections other than the square or rectangular cross section of the preferred mode. The beams could be in the form of pulses or steady streams. They could have different relative displacements and/or orientations.

The constituents of the particle beams could be moving in mutually parallel or antiparallel directions, and could be chosen with any proportions of particle density, speed, momentum or energy.

A plurality of primary and/or secondary beams may be engaged.

In a particular mode of the method, the particle beams could be substituted by assembles of particles of any one or a plurality of geometrical configurations.

In other modes of the method, the de-excitation of ions could be achieved by electron capture from a beam of only free electrons or of bound electrons belonging to ions, neutral atoms or molecules. These atoms could preferably be light atoms. Heavier atoms may also be used.

In another variation possible, the secondary beam could be of atoms or ions, and a laser beam incident on the secondary beam could be made to serve as a means of dissociating and/or ionizing the atoms, and/or to deflect the electrons toward the primary beam.

In yet another possible variation, the particle beam or beams employed in the method could have zero or non-zero net electric charge and/or display zero or non-zero net electric current.

Alternate cross sections and configurations of incidence for the laser beam providing for the deflection of electrons could be possible. In one possibility, the primary and secondary beam could lie in a plane different from the plane of travel of the laser beam, or from a plane common to the laser beam and the secondary beam. The beam could be derived as a single pulse or a plurality of pulses, or a steady radiation. Laser beams or pulses of alternate parameters relating to wavelength, intensity, or power may be used.

Alternate devices, alternate methods, or alternate geometries can be engaged to reflect the incident laser beam through the desired range of directions. For example, curved mirrors or a combination of curved and plane mirrors could be employed in substitution of plane mirrors only.

Alternate focussing techniques and devices can be applied to regulate the geometrical dimensions of the incident laser beam or pulse.

In one alternate mode, the deflection of electrons on to the ions may be achieved by alternate means than an electric field, such as by a magnetic field or fields or a combination of electric and magnetic fields, generated by any known means. Alternately, both electrons and protons may be deflected toward the ion medium; for example by a magnetic field when the two types of particles are moving in opposite directions. It may be desirable in certain modes to employ one variable magnetic field or a plurality of seperately-variable magnetic fields for deflecting the particles having charges of the same polarity or opposite polarities. The field or fields could vary sinusoidally with time or have other time dependence; or can be constant in time.

In another mode, the initiation of the production of coherent radiation at any point of the laser medium could be done by incidence of photons of an appropriate energy at the point employing an external source.

The tunability of the coherent radiation may be regulated by providing for a range of variation of the speed of the ions of the primary beam.

Coherent beams of photon frequencies higher than the emitted frequency or frequencies can be made possible; by providing for positive Doppler effect to be effective over the emission of photons. This can be accomplished while the ions emitting the coherent photons are made to be moving in the same direction as the direction of progression of the coherent photons.

SOME POSSIBLE APPLICATIONS

The conventional low-frequency lasers available today have found wide applications in numerous fields, commerce, science, technolgy, medicine and others. X-ray lasers, and high-frequency lasers in general, too may be expected to have a wide range of applications, a few examples of which are listed below.

a. Studies of nonlinear optics and plasma:

Passage of a coherent X-ray beam through an ionized medium could invoke changes in the plasma which have much theoretical and practical interest. Valuable information could be gathered on electromagnetic wave propagation in an ionized medium. Studies of physical changes introduced in plasma of varied kinds by passage of an intense radiation beam could also be facilitated by the availability of coherent X-rays.

b. Studies of atoms and materials:

The availability of a coherent X-ray beam will enable scientific studies of multiple high-energy photon-absorption processes in atoms. Similarly material properties could be investigated by use of coherent X rays.

c. Holographic studies:

High-resolution studies of biological samples can be made possible with coherent high-frequency radiations.

d. Radiation impacting of objects and communication:

The impact of radiation on materials and structures can produce effects having relevance for terrestrial and space objects. Coherent X-ray beams shall provide a new tool for studies of these effects. Specific potential applications include remote sensing, structural alteration, function neutralisation, and communication.

e. Medical applications:

Coherent X-ray pulses could be valuable in precise destruction of tumours and malignancies in the human body.

What is claimed:

1. A method of producing coherent electromagnetic radiation, comprising the steps of:
   (i) providing a primary beam of positively ionized atoms and electrons moving along a first specified path,
   (ii) providing a secondary beam of electrons and ionized atoms moving along a second specified path,
   (iii) providing a means to deflect electrons of a section of the secondary beam towards the primary beam to be made to overlap with a section of the primary beam, and
   (iv) providing a means to progressively vary the section of the secondary beam being deflected toward the primary beam so that the section of the primary beam overlapping with a section of the secondary beam shall vary, and the said varied section of the primary beam overlapping with a section of the secondary beam advances along the length of the primary beam at the speed of photons in the medium of the primary beam.

2. The method of claim 1, and further comprising the step of:
   the positively ionized atoms of the primary beam are positively ionized heavy atoms.

3. The method of claim 1, and further comprising the step of:
   the positively ionized atoms of the primary beam are largely or totally ionized atoms.

4. The method of claim 1, and further comprising the step of:
   the positively ionized atoms of the primary beam are substantially monoenergetic.

5. The method of claim 4, and further comprising the step of:
   providing a means of varying the energy of the positive ions of the primary beam.

6. The method of claim 1, and further comprising the step of:
   the ionized atoms of the secondary beam are light atoms.

7. The method of claim 1, and further comprising the step of:
   the ionized atoms of the secondary beam are protons.

8. The method of claim 1, and further comprising the step of:
   the ionized atoms of the secondary beam are negatively ionized atoms.

9. The method of claim 1, and further comprising the step of:
   the electrons of the secondary beam are electrons of negatively ionized atoms.

10. The method of claim 1, and further comprising the steps of:
    the primary beam including a first beam of positive ions moving in the specified direction, a second beam of electrons moving in the same direction as the first beam, and a third beam of electrons moving in a direction opposite to the second beam.

11. The method of claim 10, and further comprising the step of:
    the electrons in the second and third beams of the primary beam being of a high energy.

12. The method of claim 10, and further comprising the step of:
    the electrons of the second and third beams of the primary beam being substantially monoenergetic.

13. The method of claim 10 and further comprising the step of:
    the energies of the positive ions and of the electrons of the primary beam, and the proportions of the numbers of positive ions in the first beam and electrons in the second and third beams of the primary beam set to provide a total electric current of the primary beam substantially zero.

14. The method of claim 1, and further comprising the step of:
    the proportion of the total number of positive ions to the total number of electrons of the primary beam set to a total electric charge of the primary beam substantially zero.

15. The method of claim 1, and further comprising the step of:
    the secondary beam including a first beam of ionized atoms and electrons moving in a direction parallel to the primary beam and a second beam of substantially equal numbers of ionized atoms as in the first beam and substantially equal numbers of electrons as in the first beam moving in a direction opposite to the first beam.

16. The method of claim 1, and further comprising the step of:
    the ions of the secondary beam being substantially monoenergetic.

17. The method of claim 1, and further comprising the step of:
    the electrons of the secondary beam being of a low energy.

18. The method of claim 1, and further comprising the step of:
    the proportion of numbers of electrons and ionized atoms of the secondary beam set to a total electric charge of the beam to be substantially zero.

19. The method of claim 1, and further comprising the step of:
    the means of deflecting electrons of a section of the secondary beam to overlap with a section of the primary beam and the means of varying the overlap section is a high intensity laser beam swept across a length of the secondary beam.

20. The method of claim 19, and further comprising the step of:
the means of sweeping of the laser beam is a mirror means, comprising one or more reflection mirrors or one or more deflection mirrors or any combination thereof.

21. The method of claim 19, and further comprising the step of:
the paths of the primary beam, the secondary beam and the laser beam being substantially parallel and in the same plane.

22. The method of claim 19, and further comprising the step of:
the paths of the primary beam and the secondary beam are in the same first plane, and the paths of the secondary beam and the laser beam are in a second plane substantially different from the first plane.

23. The method of claim 19, and further comprising the step of:
the high intensity laser is a low frequency laser, an optical frequency laser, an ultraviolet laser, or a laser of high frequency.

24. The method of claim 1, and further comprising the step of:
providing a superconducting magnetic field in the region of the primary and secondary beams.

25. A method of creating population inversion of atomic states in part or all of an assembly of positively ionized atoms by electron capture by a plurality or all of the ionized atoms, comprising the steps of:

(i) providing a collection of positively ionized atoms (ii) providing a collection of electrons and ions, and (ii) providing an electromagnetic means of deflecting a plurality of electrons of the collection of electrons and ions toward the collection of positively ionized atoms.

26. The method of claim 25, and further comprising the step of:
the electrons being electrons of a beam of ions and electrons.

27. A method of spatially advancing population inversion in an ionized medium along a particular direction comprising the steps of:

(i) providing an assembly of positively ionized atoms, (ii) providing an assembly of electrons, (iii) providing a means of electromagnetically deflecting a plurality of electrons of the assembly of electrons toward a region of the assembly of positively ionized atoms to be incident over a region of the assembly of positively ionized atoms, and (iv) providing a means to continuously vary the region of incidence of deflected electrons across the assembly of positively ionized atoms at a specified speed.

28. The method of claim 27, and further comprising the step of:
the means of deflecting the electrons toward the assembly of positively ionized atoms is a laser beam being deflected across the assembly of electrons.

* * * * *